United States Patent [19]

Dillon

[11] Patent Number: 4,818,010
[45] Date of Patent: Apr. 4, 1989

[54] MOUNTING SYSTEM FOR EQUIPMENT IN POLICE VEHICLES

[75] Inventor: John A. Dillon, Ypsilanti, Mich.

[73] Assignee: Automotive Prototypes & Equipment, Ann Arbor, Mich.

[21] Appl. No.: 920,833

[22] Filed: Oct. 17, 1986

[51] Int. Cl.$^4$ .............................................. B60R 11/02
[52] U.S. Cl. .................................. 296/37.7; 296/378;
224/42.42; 224/311; 343/713; 343/882;
340/936; 455/99; 455/345; 248/674
[58] Field of Search .............................. 296/377, 37.8;
224/42.42, 273, 311; 343/762, 711, 713, 882;
340/936; 455/345, 99; 248/674

[56] References Cited

U.S. PATENT DOCUMENTS

| | | | |
|---|---|---|---|
| D. 246,037 | 10/1977 | Kelly | D12/155 |
| 3,065,942 | 11/1962 | Cameron | 343/882 X |
| 3,569,788 | 3/1971 | Niblack | 455/345 X |
| 3,773,378 | 11/1973 | Lewis | 296/32.7 |
| 4,079,987 | 3/1978 | Bumgardener | 296/37.7 |
| 4,100,372 | 7/1978 | Hypolite | 455/345 X |
| 4,101,159 | 7/1978 | Stewart | 296/37.7 |
| 4,122,911 | 10/1978 | Croup | 181/199 |
| 4,241,870 | 12/1980 | Marcus | 296/37.7 |
| 4,441,641 | 4/1984 | Thompson | 224/311 |
| 4,738,481 | 4/1988 | Watjer et al. | 296/37.8 |

OTHER PUBLICATIONS

J. C. Whitney, Catalog 460D, Copyright 1985, pp. 23-25.
Motor Trend, Sep. 1979, p. 24, "Cockpit" Auto Sound System.

Primary Examiner—Dennis H. Pedder
Attorney, Agent, or Firm—Krass and Young

[57] ABSTRACT

The present invention is a ceiling console mounting system for equipment in police vehicles. The ceiling console is secured at the front by a forwardly extending tongue wedged between the ceiling and the upholstery molding and at the rear by attachment to the light mount for the ceiling dome light. A plurality of units of police equipment are mounted in the ceiling console. The radio or radio control unit is disposed in the forward portion of the ceiling console with the front panel disposed vertically so as to be readily visible at just above the normal eye level. Other units of electronic equipment are disposed rearward of the radio or radio control unit with front panels disposed to be substantially parallel to the upraised hand. The ceiling console is preferably constructed of an upper spine and a plurality of lower shells whose attachment to the upper spine allows adjustment to the contour of the ceiling of the particular vehicle. This invention is advantageous because the ceiling console can be easily installed and deinstalled in a variety of vehicles, it secures the police equipment in a safe manner and it causes no damage to the vehicle, thereby improving the resale value of the vehicle upon retirement from police service.

15 Claims, 2 Drawing Sheets

MOUNTING SYSTEM FOR EQUIPMENT IN POLICE VEHICLES

FIELD OF THE INVENTION

The field of the present invention is that of ceiling console mounting systems for equipment in vehicles, and in particular equipment in police vehicles.

BACKGROUND OF THE INVENTION

The present invention is particularly related to mounting equipment in police vehicles. It is well understood that extensive modifications are required in order to convert a vehicle into a vehicle for police use. In particular, an assortment of electronic equipment must somehow be mounted in the vehicle in a manner which is convenient to the police officers operating the vehicle and which is done at a minimum cost. Typically, a police vehicle will require accessible mounting of a radio, or a controller for a radio mounted elsewhere, a switching control panel for controlling auxiliary equipment such as the various outside lights included in the police vehicle, and a siren control unit. Heretofore, two main systems were employed in order to mount the electronic equipment in a police vehicle.

The first of these mounting systems is termed an equipment tree. The equipment tree is a tower-like mounting bracket disposed on the transmission hump in the center of the front seat of the police vehicle just rearward of the dashboard. This bracket is typical secured by being bolted to the floor of the vehicle at the transmission hump and cross braced by members extending under the dash of the vehicle to some structural member. The various equipment required is secured to this equipment tree.

The use of equipment trees such as described above has numerous disadvantages. Firstly, this equipment tree can be a severe knee hazard to police officers occupying either front seat of the police vehicle. Because vehicle models differ widely in the dimensions and shape of the transmission hump, and in the position of the structural members underneath the dash to which the cross braces must be attached, installation of such an equipment tree must be a semi-custom operation. This installation therefore requires a large amount of labor. In addition, the extensive cutting and bolting necessary to perform this installation causes a great deal of damage to the vehicle. This damage to the vehicle reduces the resale value of the vehicle when it is retired from police service. In addition, because of the semi-custom form of installation, it is difficult and expensive to deinstall the equipment tree when the police vehicle is retired from service.

The second form of equipment mounting is an in dash mounting. In this case, the ordinary electronic equipment provided with the vehicle is removed and replaced by the extensive equipment required for the police vehicle. In addition, further in dash mounting, beyond those ordinarily provided in the vehicle received from stock, are often required in order to accommodate the numerous units of equipment required in the vehicle. Such an installation must be customized to the particular vehicle model, because the dash configurations of vehicle models differ so greatly. In addition, as in the case of the equipment tree, extensive labor is required to install and deinstall the police equipment. A further disadvantage is that the installation is at the mercy of the designers of the motor vehicles employed, because a minor change in the vehicle interior design often requires major changes in the installation technique for the police equipment required. Although this technique is not as destructive as the equipment tree, it still causes a good deal of damage to the vehicle, consequently reducing the resale value of the vehicle upon retirement from police service.

These factors provide a dilemma to the fleet manager whose task it is to provide the proper vehicles to the police officers at a minimum cost. As a consequence, it would be highly advantageous to provide a manner of mounting the electronic equipment required in a police vehicle in a manner not requiring extensive custom modification of the vehicle, which would be easy to deinstall upon retirement of the vehicle from police service and which would cause a minimum of damage to the police vehicle, thereby increasing the resale value and reducing the total cost of operation of the vehicle to the police force.

SUMMARY OF THE INVENTION

The present invention is a ceiling console mounting system for equipment in police vehicles which is easy and inexpensive to install and deinstall, and which causes no damage to the vehicle. This object is achieved by the manner in which the ceiling console is attached to the vehicle.

In accordance with a preferred embodiment of the present invention, the ceiling console is secured at the forward edge of the ceiling and at the central portion of the ceiling. The forward portion of the ceiling console is attached to the forward portion of the ceiling by wedging a forwardly extending tongue between the central portion of the front upholstery molding and the ceiling. The rear portion of the ceiling console is secured to the existing light mounting clip ordinarily employed to mount the ceiling dome light by a unique adaptor bracket. This attachment is made to a rear mounting bubble which permits some fore and aft adjustment to accommodate vehicles having slightly differing distances between the top of the windshield and the light mounting clip. The units of electrical equipment are then disposed within this ceiling console.

In accordance with an additional feature of the present invention, the ceiling console is formed of an upper spine and a plurality of lower shells. The upper spine includes the forwardly extending tongue and the rear mounting system. The lower shells include the compartments for housing the units of electrical equipment. The upper spine has a curvature designed to conform to the shape of most vehicle roofs. This upper spine also includes downwardly extending flanges on either side. Each lower shell, besides including compartments for housing the electrical equipment, includes upwardly extending flanges which are constructed in order to overlap the flanges of the upper spine. Each lower shell is positioned relative to the ceiling in a manner which can accommodate variations in the shape of the ceiling. Then a common set of holes is drilled through the flanges on the upper spine and the lower shells. The lower shells are then attached to the upper spine, preferably by nylon expandable rivets. Using this technique enables greater adjustment to the shape of the ceiling of the vehicle and easy accessibility for maintenance.

In accordance with this embodiment, the units of electrical equipment mounted in the ceiling console include a police radio control unit, a plurality of control switches, a plurality of fuses visible to the user, a siren control unit, a radio speaker and a pair of pivotally adjustable spotlights. These spotlights are optionally disposed in either the front or rear portion of the ceiling console and serve to replace the ceiling dome light which is removed in order to mount the ceiling console. In an alternative embodiment a police radar antenna is pivotably mounted in the forward portion of the ceiling console.

In accordance to another aspect of the present invention, the geometry of mounting of the units of electrical equipment is carefully selected in order to provide maximum utility to the user. In accordance with this aspect of the invention, the unit of electrical equipment requiring the greatest visual attention, which is ordinarily the police radio or police radio control unit, is mounted in the forward portion of the ceiling console. This invention provides a design that is adaptable to most popular police radio units without modification of the radio. This unit of equipment is mounted generally parallel to the ceiling and substantially horizontal. The front panel of this unit of equipment is disposed at a front panel plane which faces to the rear of the vehicle and is easily visible to a user in either front seat of the vehicle. Other units of equipment which do not require as much visual attention but which do require operator control, are disposed rearward of the first unit equipment. This equipment is disposed at an angle to the horizontal with their front control panels disposed at respective front control panel planes which are likewise inclined to the vertical. The angle that this front panel plane makes to the vertical is selected in order that the control panel will be parallel to the upraised hand of the user as the user is seated in one of the front seats of the vehicle. This position of the additional units of equipment allows ease of use while remaining unobtrusive.

In accordance with a further feature of this aspect of the invention, a high fidelity speaker for the police radio is mounted in the rear portion of the ceiling console. This mounting places the speaker nearer to the ear of the user than previously employed in the in dash or equipment tree mounting. Thus, it is possible to reduce the volume of sound produced by the speaker without reducing the understandability of the radio.

In accordance with a further feature of this aspect of the invention, the ceiling dome light is replaced by a pair of spotlights optionally disposed in either the forward or the rear portion of the ceiling console. These spotlights are preferably pivotally mounted in order to be able to illuminate selected portions of the vehicle and in particular the area in the vicinity of the lap of the officer sitting in either front seat where the officer would be most likely to do paperwork without over-lighting or flood lighting the total interior of the vehicle as with the original equipment dome light.

In accordance with a feature of an alternative embodiment of the present invention, the antenna unit for a police radar is pivotally mounted in the forward portion of the ceiling console below the police radio or radio control unit. This mounting permits the radar beam to be selectively directed to any forward angle from the police vehicle. The police radar transceiver and control unit may be disposed in the console or may be coupled to the antenna via a jack and relocated between vehicles.

BRIEF DESCRIPTION OF THE DRAWINGS

These and other features and aspects of the embodiments of the present invention will be understood from the foregoing description taken in conjunction with the drawings in which.

DETAILED DESCRIPTION OF THE PREFERRED EMBODIMENT

Figure 1:
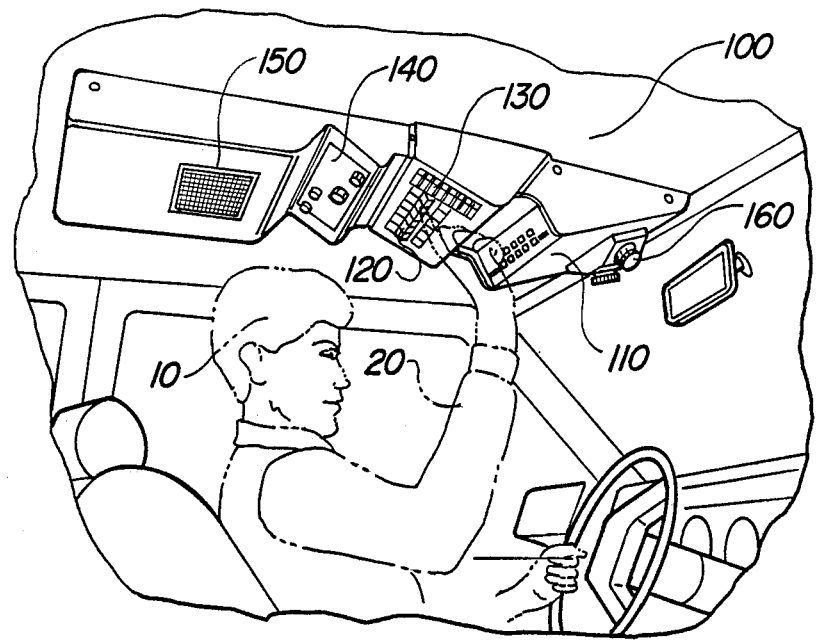
FIG. 1 illustrates a view of the ceiling console in accordance with the preferred embodiment of the present invention mounted in the vehicle.

FIG. 1 illustrates the ceiling console of the present invention mounted in a vehicle. Console 100 extends from the center of the front of the ceiling just above the windshield to the central portion of the ceiling. Console 100 includes compartments which hold numerous units of electrical equipment used in the police vehicle. This electrical equipment includes radio control unit 110, police/emergency switching control panel 120, fuses 130, siren control panel 140, speaker 150 and light unit 160.

FIG. 1 also includes illustration of the relationship between the user of the vehicle and console 100. FIG. 1 illustrates head 10 which is located in the position expected for the head of the driver of the vehicle. FIG. 1 also illustrates arm and hand 20 which is shown as reaching toward the switching control panel 120 of console 100. It should be understood that an officer occupying the other front seat of the vehicle would have the same relationship to the console 100 as the driver position illustrated except that right and left hands would be reversed.

Figure 2:
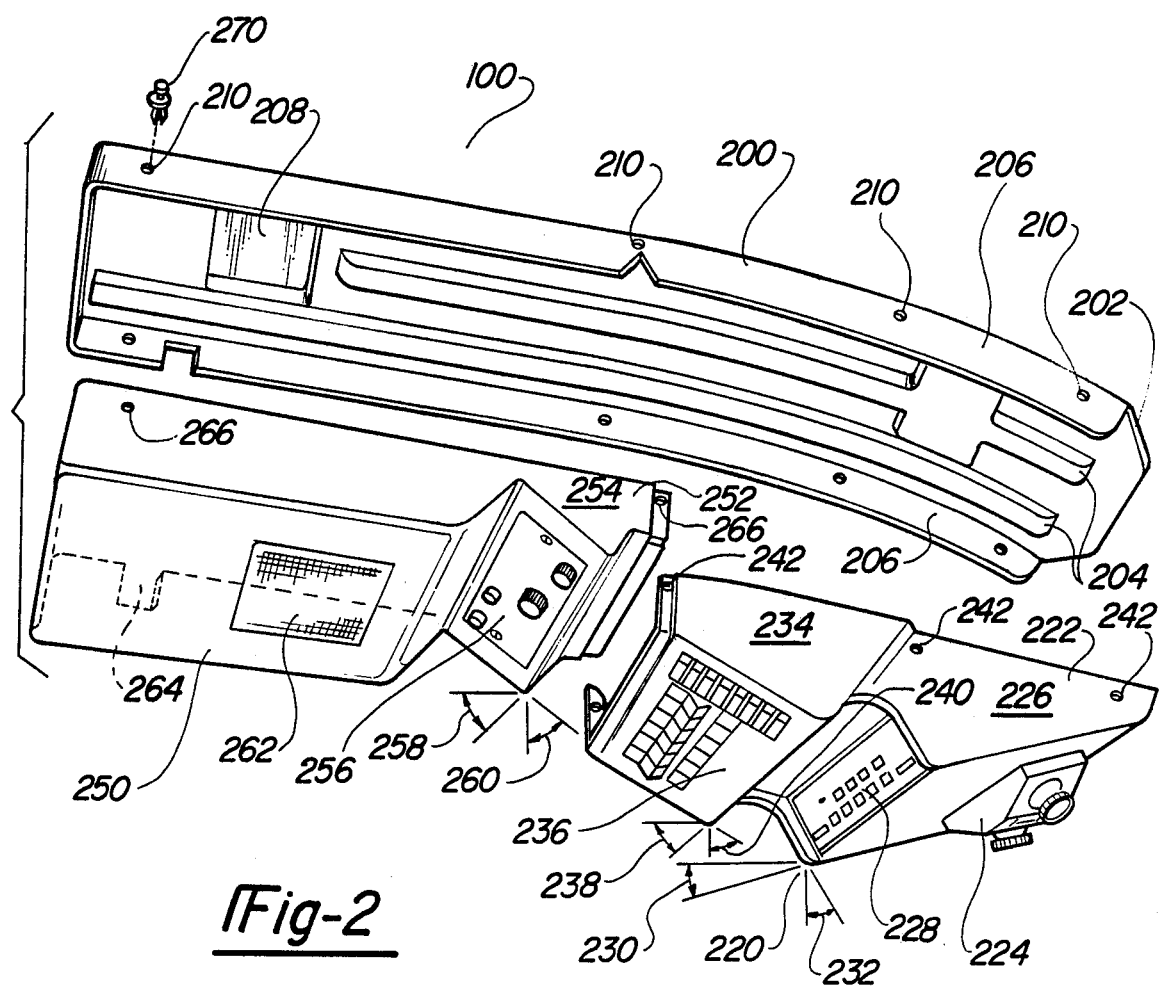
FIG. 2 illustrates an exploded view of the various parts of the preferred embodiment of the ceiling console of the present invention.

FIG. 2 illustrates an exploded view of console 100 showing its manner of construction in accordance with the preferred embodiment. Console 100 preferably includes upper spine 200, front lower shell 220 and rear lower shell 250. In the preferred embodiment these parts are coupled together employing a plurality of one-sided nylon expandable rivets 270.

Console 100 is attached to the vehicle via upper spine 200. Upper spine 200 includes front tongue 202 which extends from the forward portion of upper spine 200. Upper spine 200 also includes a plurality of strengthening ridges 204 which run lengthwise through the upper surface of upper spine 200. A pair of flanges 206 extend downwardly from either side of upper spine 200. As will be further disclosed below, the lower shells are attached to the upper spine 200 via these flanges 206. Upper spine 200 further includes rear mounting bubble 208. The console 100 is attached to the existing light mount clip in the center of the ceiling of the vehicle via rear mounting bubble 208 in a manner that will be further described below. Lastly, upper spine 200 includes rivet holes 210 which are used to secure the upper spine 200 to the two lower shells.

Front lower shell 220 forms the forward portion of the bottom of console 100. Front lower shell 220 includes upwardly extending flanges 222. Flanges 222 are constructed in order to enclose and overlap flanges 206 in upper spine 200. As will be further described below, flanges 222 enable front lower shell 220 to be secured to the upper spine 200. Front lower shell 220 also includes a mounting bubble 224. In accordance with the preferred embodiment of the present invention, a pair of pivotally disposed spotlights together with corresponding control switches are disposed in mounting bubble 224. This location enables the spotlights to be used to illuminate the work surface at the officer's lap where the officer ordinarily handles his paper work. Lights at this location do no illuminate the entire interior of the vehicle as the original equipment ceiling dome light. This advantageously reduces the visibility of the officer from the exterior of the vehicle, reducing his vulnerability to hostile persons while doing paper work. In accordance with an alternative embodiment, a police radar antenna is pivotally disposed in mounting bubble 224.

Front lower shell 220 includes the compartment for housing the police radio or police radio control unit. Radio control compartment 226 is disposed generally parallel to the front portion of the ceiling and makes angle 230 to the horizontal. In accordance with the preferred embodiment, this angle 230 is near zero. Radio control compartment 226 includes a front panel plane 228 for accommodation of the front panel of the radio or radio control unit. This front panel plane 228 makes an angle 232 with respect to the vertical. In accordance with the preferred embodiment of the present application, this angle 232 is near zero.

Front lower shell 220 further includes switching control compartment 234. In accordance with the preferred embodiment, the switch panel for controlling various units of police equipment, including for example the outside lights of the police vehicle, are disposed in this compartment. In addition, as illustrated in FIG. 1, the fuses 130 for the numerous pieces of electrical equipment disposed in console 100 are also placed in switching control compartment 234. Switching control compartment 234 includes a front panel plane at 236 where the front control panel of the switching control unit is disposed. Switching control compartment 234 is inclined to the horizontal at an angle 238. Similarly, the front panel plane 236 is inclined to the vertical at an angle 240. The significance of angle 240 between front panel plane 236 and the vertical will be further described below.

Front lower shell 220 further includes rivet holes 242. These rivet holes 234 are aligned with some of the rivets holes 210 in upper spine 220 in order to couple front lower shell 220 to the upper spine 200.

The rear of the lower portion of console 100 is formed by rear lower shell 250. Rear lower shell 250 includes flanges 252, similar to flanges 222 in front lower shell 220. These flanges 252 permit rear lower shell 250 to be coupled to upper spine 200. In accordance with the present invention, rivet holes 266 are aligned with some of the rivet holes 210 of upper spine 200 and secured via one-sided nylon expandable rivets 270.

Rear lower shell 250 includes compartments for housing several units of police equipment. This includes the siren control compartment 254, the speaker grill 262 and the cable cutout 264.

Rear lower shell 250 includes siren control compartment 254. Siren control compartment 254 has a front panel plane 256, where the control panel for the siren control unit is disposed. Siren control compartment 254 makes an angle 258 to the horizontal. Similarly, the front control plane 256 makes an angle 260 to the vertical. The significance of this angle 260 will be further disclosed below.

The rearmost portion of rear lower shell 250 includes speaker grill 262 and cable cutout 264. Speaker grill 262 is preferably formed in a downward facing portion of rear lower shell 250. A high fidelity speaker for the police radio is preferably disposed in rear lower shell 250 opposite speaker grill 262. This mounting for the radio speaker is much better acoustically than the prior in dash or equipment tree mounting. The speaker in this location is much nearer the ears of the officer than in the prior art. In addition the location is much less busy acoustically, with a reduced incidence of spurious acoustic reflections. These factors enable the use of a high fidelity speaker with a reduced volume as compared to the prior art. The reduced volume and higher fidelity reduces the fatigue caused by the radio sound.

Cable cutout 264 enables the cables from the various units of electrical equipment to be connected to other systems within the vehicle. This cable cutout allows the cable to be led out from the rear portion of the console 100 which is in the central portion of the ceiling of the vehicle, along the ceiling of the vehicle through a special conduit (not shown) to one of the door pillars, and hence down the door pillar through the existing vehicle wire channel to the floor. From there it can be routed to any portion of the vehicle desired via the existing vehicle wire channels. Alternatively this cable can be disposed along the front portion of a security shield between the front and rear seats.

In accordance with the preferred embodiment of the present invention, the front panel planes 228, 236 and 256 make angles 232, 240 and 260, respectively, to the vertical in a predetermined manner defined by the geometry of the interior of the vehicle. The angle 232 between vertical and the front panel plane 228 is preferably near zero or slightly downward facing. By this means, front panel plane 228 is readily within the field of view of the operator and slightly above the normal line of vision outside the windshield to the road ahead. In the preferred embodiment of the present invention, the unit of electrical equipment requiring the most visual attention is to be placed in this position. In the embodiment illustrated in FIG. 1, this unit of electrical equipment is the radio control unit.

A differing geometry is employed to the angle to vertical 240 and 260 of front panel planes 236 and 256, respectively. These compartments are to be employed for switching or control units or the like which do not require the same degree of visual attention as the radio control unit housed in radio control compartment 226. As such, these units of electrical equipment are best disposed at an angle that is readily reached by the hand. Therefore, these angles should be inclined to the vertical so that when the operator raises the nearside hand, the front panel plane is substantially parallel to the surface of the hand. Note that this relationship would be approximately the same for the right hand of the driver as for the left hand of the front seat passenger.

Adaptor bracket 280 enables mounting of the upper spine 200 to the light mount clip via rear mounting bubble 208. Adaptor bracket 280 is coupled to the light mount clip via sheet metal screws 282. Then the rear mounting bubble 208 is connected to adaptor bracket 280 via bolts 284.

Figure 3:
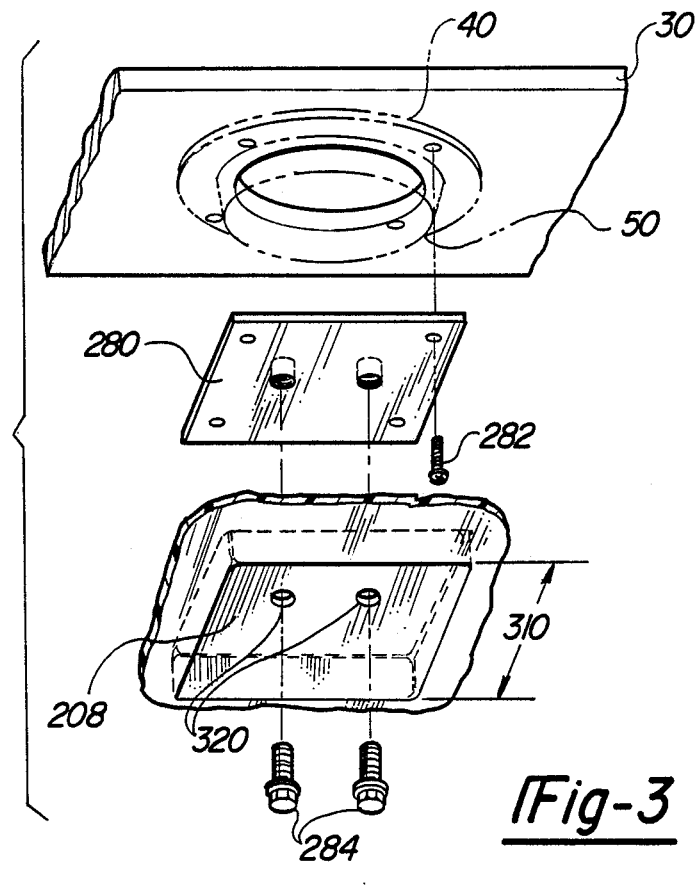
FIG. 3 illustrates the details of the dome light mounting of the rear portion of the ceiling console in accordance with the preferred embodiment of the present invention.

The manner of installing the ceiling console will now be explained in conjunction with the detailed exploded diagram appearing in FIG. 3. In the preferred embodiment, the upper spine 200, the front lower shell 220 and the rear lower shell 250 are all constructed of A.B.S. high impact plastic. This material can easily be vacuum-formed to the shape required. Installation is begun by wedging forwardly extending tongue 202 between the ceiling upholstery molding and the ceiling.

The rear of upper spine 200 is attached to the ceiling in a manner that will be explained in conjunction with FIG. 3. Firstly, the dome light 50 must be removed from the light mount clip 40 ordinarily disposed in the central portion of the ceiling of the vehicle. The light mount clip 40 is ordinarily disposed in a transverse ceiling beam 30. Removal of dome light 50 ordinarily requires merely removing a set of sheet metal screws which attach dome light 50 to light mount clip 40.

Rear mounting bubble 208 of upper spine 200 is attached to light mount clip 40 via adaptor bracket 280. Firstly, the adaptor bracket 280 is attached to the light mount clip 40 via sheet metal screws 282. It may be necessary to insert adapter bracket 280 within an existing cutout appearing in the upholstery of the ceiling (not shown).

Once the adaptor bracket 280 has been attached, then the location for bolt holes 320 is determined. Rear mounting bubble 208 includes an adjustment zone 310 for accommodation of bolt holes 320. It has been found that the distance between the front upholstery molding and the light mount clip in the center of the ceiling is generally constant. However, small variations between vehicle models exist. Adjustment zone 310 enables accommodation of these small variations in the vehicle models. Bolt holes 320 are drilled in a position within adjustment zone 310 determined by the exact location of bolt holes 286 in adaptor bracket 280. Bolt holes 320 may be disposed on rear mounting bubble 208 anywhere within adjustment zone 310, thereby permitting adjustment to small variations in the distance between the front and the center of the ceiling. Once bolt holes 320 have been drilled, then rear mounting bubble 208 is attached to bolt holes 286 via bolts 284. This mounting technique provides a small distance between the upper surface of upper spine 200 and the upholstery of the ceiling, thereby effectively eliminating damage to the ceiling upholstery upon this installation.

It has been found that many vehicles employed as police vehicles have a similar light mount clip 40. In particular, it has been found that a single adaptor bracket 280 may be used for all Ford and General Motor vehicles. A second adaptor bracket with a slightly different position of screw holes 288 for accommodation of sheet metal screws 282, can be employed in most Chrysler models. Naturally, the particular adaptor bracket employed in any installation depends upon the model of the vehicle in which the ceiling console 100 is being installed.

It has been found that the light mount clip 40 of the vehicles being converted into police vehicles generally has the required strength to hold up the ceiling console 100. Light mount clip 40 is almost always a part of transverse ceiling beam 30. Transverse ceiling beam 30 generally runs across the ceiling between the two door pillars. Thus, light mount clip 40 is undoubtedly the strongest portion of the ceiling of the vehicle. Thus ceiling console 100 is secured by the front tongue 202 and the attachment to light mount clip 40 as illustrated in FIG. 3.

A description will now be made of the further steps in assembly of ceiling console 100. Firstly, the desired units of electrical equipment are installed within front lower shell 220 and rear lower shell 250. In accordance with the preferred embodiment, front lower shell 220 includes a light unit 160, and a radio control unit 110, a switching control panel 120 and fuses 130 (illustrated in FIG. 1). In addition, rear lower shell 250 includes siren control panel 140 and speaker unit 150 (illustrated in FIG. 1). Next, these two lower shells are attached to upper spine 200 which has been previously attached to the ceiling of the vehicle. Upper spine 200 includes a curvature which is selected to generally follow the ceiling line of most vehicles employed at police vehicles. However, it is understood that whatever shape is selected for upper spine 200, it will not be able to accommodate all models of vehicles which are employed as police vehicles.

The manner of installation of front lower shell 220 and rear lower shell 250 can accommodate differences in the ceiling shape. Firstly, front lower shell 220 is held to the ceiling in conformity as best as possible to the shape of the ceiling, with the flanges 222 overlapping on the outside of the flanges 206 of upper spine 200. Once the desired position of the front lower shell 220 is determined, then holes are drilled through flanges 222 and 206. These flanges are drilled at substantially the same time in order to be in alignment with the desired position of front lower shell 220. A similar process takes place with rear lower shell 250, the result being a set of rivet holes 242 and 266 for attachment of front lower shell 220 and rear lower shell 240 to the upper spine 200. The final assembly is achieved employing nylon expandable rivets 270, which are adapted for deployment from outside of ceiling console 100. In particular, rivets 270 are inserted into the rivet holes in the flanges 206, 222 or 252. Then the movable expander of the nylon expandable rivet is pressed into the rivet, expanding the rivet on the opposite side of the rivet holes, thereby securing the flanges together. This particular construction is particularly advantageous because it is relatively quick and simple and enables additional conformation of the ceiling console to the shape of the ceiling of the vehicle. Nylon expandable rivets 270 are constructed so that the movable expander can be removed permitting the removal of the rivets for disassembly of the ceiling console 100. Disassembly may be required for service of the console 100 or the equipment therein.

It is believed that this installation technique will involve no damage to the vehicle. The ceiling console 100 can be deinstalled by removing the nylon expandable rivets 270, lowering the front lower shell 220 and the rear lower shell 250, removing bolts 284 to disconnect rear mounting bubble 208 from adaptor bracket 280 and removing the forwardly extending tongue 202 from between the upholstery molding and the ceiling. Then adaptor bracket 280 may be removed and dome light 50 replaced. Thus, ceiling console 100 can be quickly and easily removed and the vehicle returned to stock condition.

Figure 4:
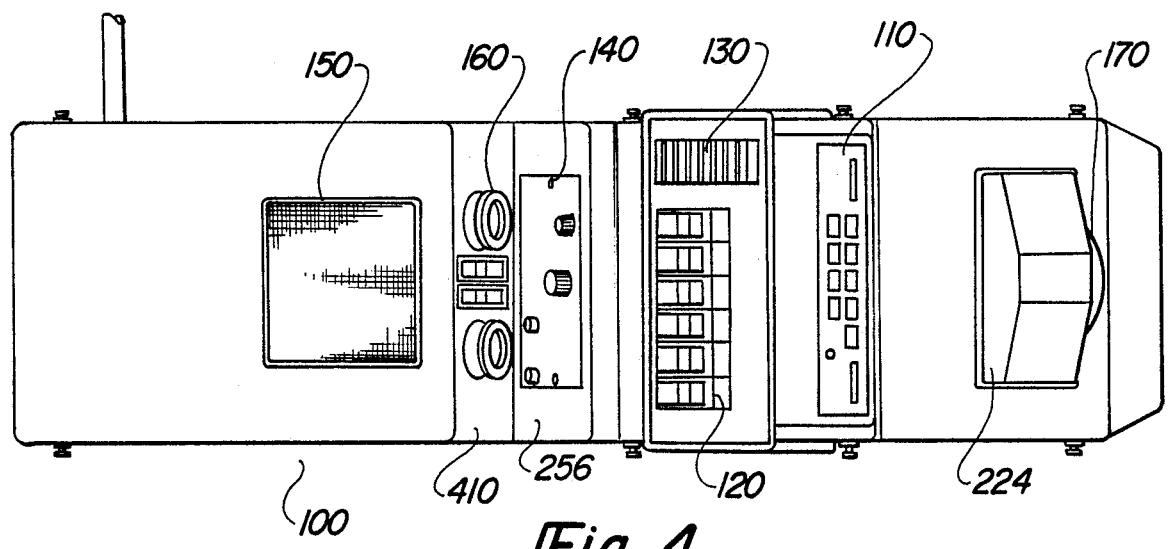
FIG. 4 illustrates a bottom view of the ceiling console in accordance with an alternative embodiment in Which a radar antenna is mounted in the forward portion of the console.

FIG. 4 illustrates an alternative embodiment of the present invention. In the embodiment of FIG. 4, radar antenna 170 is pivotally mounted in the mounting bubble 224. This radar antenna 170 is preferably mounted to be capable of directing its beam to a range of forward looking angles. This will enable the police vehicle to be parked in a variety of angles to the road while still permitting the radar unit to be employed to measure the speed of other vehicles. The radar transceiver and control unit may be mounted in console 100 or removably attached via a jack.

The light unit 160 illustrated in FIG. 4 is disposed more rearward than that illustrated in FIG. 1. In this alternative embodiment the light unit 160 is mounted between siren control unit 140 and speaker 150. Light unit 160 is disposed on a forward facing panel 410 opposite control panel plane 256. Light unit 160 consists of two pivotally disposed small spot lights together with two corresponding on-off switches. This location enables illumination of similar areas of the interior of the vehicle as the location illustrated in FIG. 1. This location also advantageously reduces the visibility of the officer from the exterior of the vehicle as compared to the original equipment dome light.

The provision for making a minimal damage in the vehicle is highly important in police vehicles. Typically, vehicles employed as police vehicles are not used for their entire life as police vehicles. On the contrary, generally after only a few years of service, these vehicles are retired from police service. This retirement from police service requires that all of the extra equipment deployed in the vehicles be removed. In accordance with the prior art techniques noted above, this deinstallation of the police equipment is difficult and expensive. In addition, due to the manner of mounting the equipment according to the prior art, a certain amount of damage is done to the vehicle no matter how skillfully the installation and deinstallation process is carried out. Therefore, employing the technique of the present invention increases the resale value of the police vehicle upon retirement of the vehicle from police service. This increase in resale value, due to the elimination of damage to the vehicle, could be on the order of several hundred to five hundred dollars per vehicle. It can clearly be seen that this technique is thus highly advantageous even if only a moderate sized police vehicle fleet is employed.

Although the present invention has been disclosed in accordance with the preferred embodiment, adaptions of the present invention are possible. Accordingly, the present application should be read in accordance with the following claims which clearly define the invention.

I claim:

1. A vehicle ceiling mounted console for use in a vehicle having a ceiling upholstery secured by an upholstery molding and an interior dome light mounted to a light mount in the central portion of the vehicle ceiling, said vehicle ceiling mounted console comprising:

an elongated generally rectangular housing having a length for extending between a forward edge of the ceiling rearward along a longitudinal center line of the ceiling to a central portion of the ceiling and having an upper surface generally conformal to the surface of the ceiling;

a forwardly extending tongue disposed on the forward edge of said elongated housing adapted to wedge between a front portion of the upholstery molding and the ceiling for securing the forward edge of said elongated housing;

a plurality of mounting means disposed in said elongated housing, each adapted for mounting a unit of electrical equipment;

an adaptor bracket having a first set of holes therein disposed to correspond to a screw holes in the light mount and having a second set of holes therein adapted to receive mounting bolts;

a rear mounting bubble formed in the upper surface of the rear portion of said elongated housing, said rear mounting bubble extending longitudinally an adjustment distance, said rear mounting bubble having a set of holes therein corresponding to said second set of holes of said adaptor bracket;

a set of screws for securing said adaptor bracket to the light mount via said first set of holes; and a set of bolts for coupling said rear mounting bubble via said set of holes to said adaptor bracket via said second set of holes, whereby the location of said set of holes in said rear mounting bubble is selected during installation within said adjustment distance to account for differences in length in the vehicle from the upholstery molding to the light mount.

2. The vehicle ceiling mounted console as claimed in claim 1, wherein:

said plurality of mounting means includes a first mounting means located in a forward portion of said elongated housing having a first compartment and a rearwardly exposed first front panel plane;

said vehicle ceiling mounted console further includes a police radio control unit disposed in said first compartment having a frontal control panel disposed at said first front panel plane.

3. The vehicle ceiling mounted console as claimed in claim 2, wherein:

said plurality of mounting means includes a second mounting means located in said elongated housing rearward of said first mounting means, said second mounting means having a second compartment and a rearwardly facing second front panel plane;

said vehicle ceiling mounted console further includes a police vehicle switching control unit disposed in said second compartment and having a frontal control panel at said second front panel plane.

4. The vehicle ceiling mounted console as claimed in claim 2, wherein:

said plurality of mounting means includes a second mounting means located in said elongated housing rearward of said first mounting means, said second mounting means having a second compartment and a rearwardly facing second front panel plane;

said vehicle ceiling mounted console further includes a plurality of fuses for the units of electrical equipment mounted in said elongated housing, said fuses disposed in said second compartment on said second front control panel.

5. The vehicle ceiling mounted console as claimed in claim 2, wherein:

said plurality of mounting means includes a second mounting means located in said elongated housing rearward of said first mounting means, said second mounting means having a second compartment and a rearwardly facing second front panel plane;

said vehicle ceiling mounted console further includes a police siren control unit disposed in said second compartment and having a frontal control panel at said second front panel plane.

6. The vehicle ceiling mounted console as claimed in claim 2, wherein:

said plurality of mounting means includes a forward second mounting means located in said elongated housing rearward of said first mounting means having a forward second compartment and a forward second front panel plane, and a rear second mounting means located in said elongated housing rearward of said forward second mounting means having a rear second compartment and a rear second panel plane;

said vehicle ceiling mounted console further includes a police vehicle switching control unit disposed in said forward second compartment and having a frontal control panel at said forward second front panel plane;

said vehicle ceiling mounted console further includes a police siren control unit disposed in said rear second compartment and having a frontal control panel at said rear second front panel plane.

7. The vehicle ceiling mounted console as claimed in claim 1, wherein:

said adaptor bracket is selected from among a set of adaptor brackets dependent upon the model of vehicle to which the ceiling mounted console is to be mounted, each adaptor bracket of said set of adaptor brackets having said first set of holes corresponding to the screw holes in the light mount of a corresponding vehicle model.

8. The method of installing a ceiling console in a vehicle having a ceiling upholstery secured by an upholstery molding, and an interior dome light mounted on a light mount in the central portion of the vehicle ceiling, comprising the steps of:

wedging a forwardly extending tongue projecting from a forward edge of an elongated housing between the ceiling and a front portion of the upholstery molding, thereby securing the forward edge of the elongated housing;

removing the interior dome light from the light mount in the central portion of the vehicle ceiling:

securing the rear portion of the elongated housing to the light mount by securing an adaptor bracket to the light mount, forming a rear mounting bubble in the upper surface of the elongated housing, the rear mounting bubble extending longitudinally for an adjustment distance, and securing the rear mounting bubble to the adaptor bracket at a position within the adjustment distance determined by the distance between the upholstery molding and the light mount in the vehicle; and housing a plurality of units of electrical equipment in the elongated housing.

9. The method of installing a ceiling console as claimed in claim 8, wherein:

said step of securing the rear mounting bubble to the adaptor bracket includes drilling a set of holes in the rear mounting bubble at a position determined by the distance between the upholstery molding and the light mount clip, and bolting the rear mounting bubble to the adaptor bracket via the set of holes in the rear mounting bubble.

10. The method of installing a ceiling console as claimed in claim 8, wherein:

said step of securing the rear portion of the elongated housing further includes forming a set of a plurality of different adaptor brackets, each adaptor bracket of said set of adaptor brackets corresponding to the light mount of a set of at least one vehicle model, and selecting an adaptor bracket from among the set of adaptor brackets dependent upon the model of the vehicle to which the ceiling console is to mounted.

11. The method of installing a ceiling console in a vehicle having a ceiling upholstery secured by an upholstery molding, and an interior dome light mounted on a light mount in the central portion of the vehicle ceiling, comprising the steps of:

wedging a forwardly extending tongue projecting from a forward edge of an elongated housing between the ceiling and a front portion of the upholstery molding, thereby securing the forward edge of the elongated housing;

removing the interior dome light from the light mount in the central portion of the vehicle ceiling:

securing the rear portion of the elongated housing to the light mount; and housing a plurality of units of electrical equipment in the elongated housing by forming the elongated housing as an upper spine with a forward edge where the forwardly extending tongue is disposed and a rear portion for securing to the light mount and having a pair of downwardly extending first flanges, one disposed on either side of the upper spine and a plurality of lower shells, each having a pair of upwardly extending second flanges, one disposed on either side of the lower shell to overlap the first flanges, housing the plurality of units of electrical equipment in the plurality of lower shells, positioning each lower shell with the second flanges overlapping the first flanges and in conformity to the ceiling, drilling a plurality of holes through the positioned second flanges of each lower shell, and through corresponding locations in the first flanges, and securing each lower shell to the upper spine via the plurality of holes in each second flange and the corresponding holes in the first flange, whereby the position of the lower shells is selectable during installation to accommodate variations in the shape of the ceiling.

12. The method of installing a ceiling console as claimed in claim 11, wherein:

said step of securing each lower shell to the upper spine includes inserting one-sided expandable rivets through each of the plurality of holes in each second flange and the corresponding bolt holes in the first flange and expanding the expandable rivet to secure each lower shell to the upper spine.

13. A vehicle ceiling mounted console for use in a vehicle having a ceiling upholstery secured by an upholstery molding and an interior dome light mounted to a light mount in the central portion of the vehicle ceiling, said vehicle ceiling mounted console comprising:

an elongated generally rectangular housing having a length for extending between a forward edge of the ceiling rearward along a longitudinal center line of the ceiling to a central portion of the ceiling, said elongated housing including an upper spine extending longitudinally from the forward edge of the ceiling to the central portion of the ceiling, said upper spine having a curvature selected to be generally conformal to the ceiling of a selected group of vehicles, a pair of downwardly extending first flanges, one disposed on either side thereof, a forwardly extending tongue disposed in a forward edge thereof adapted to wedge between a front portion of the upholstery molding and the ceiling for securing the forward edge of said elongated housing, and a rear mounting means disposed in the upper surface of the rear portion thereof adapted for securing the rear portion of said elongated housing to the light mount in the central portion of the ceiling; and a plurality of lower shells, each lower shell having a pair of upwardly extending second flanges, one disposed on either side thereof, to overlap and attached to said first flanges, said plurality of lower shells in combination forming a plurality of mounting means disposed in said elongated housing, each adapted for mounting a unit of electrical equipment.

14. The vehicle ceiling mounted console as claimed in claim 13, wherein:

the attachment between said first and second flanges is selectable during installation for permitting adjustable fitting of each lower shell to accommodate variations in the shape of the ceiling.

15. The vehicle ceiling mounted console as claimed in claim 14, wherein:

the attachment between said first and second flanges is via a plurality of expandable rivets through corresponding rivet holes disposed at locations selectable during installation.

* * * * *